(12) United States Patent
Feinberg et al.

(10) Patent No.: US 7,711,550 B1
(45) Date of Patent: May 4, 2010

(54) METHODS AND SYSTEM FOR RECOGNIZING NAMES IN A COMPUTER-GENERATED DOCUMENT AND FOR PROVIDING HELPFUL ACTIONS ASSOCIATED WITH RECOGNIZED NAMES

(75) Inventors: Yaniv Feinberg, Redmond, WA (US); Athapan Arayasantiparb, Redmond, WA (US); Thiti Wang-Aryattawanich, Redmond, WA (US); Mohamed A. Abbar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 10/426,446

(22) Filed: Apr. 29, 2003

(51) Int. Cl.
*G06F 17/27* (2006.01)
*G06F 17/20* (2006.01)
*G06F 17/21* (2006.01)

(52) U.S. Cl. ............................ 704/9; 704/1; 704/10
(58) Field of Classification Search ............... 704/9, 704/1, 10
See application file for complete search history.

(56) References Cited

U.S. PATENT DOCUMENTS

| | | | |
|---|---|---|---|
| 4,674,065 A | 6/1987 | Lange et al. | 364/900 |
| 4,868,750 A | 9/1989 | Kucera et al. | 711/2 |
| 5,020,019 A | 5/1991 | Ogawa | 364/900 |
| 5,128,865 A | 7/1992 | Sadler | 704/2 |
| 5,159,552 A | 10/1992 | van Gasteren et al. | 704/1 |
| 5,267,155 A | 11/1993 | Buchanan et al. | 364/419.14 |
| 5,287,448 A | 2/1994 | Nicol et al. | 715/707 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 395/155 |
| 5,418,902 A | 5/1995 | West et al. | 715/503 |
| 5,446,891 A | 8/1995 | Kaplan et al. | 395/600 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,567 A | 5/1997 | Davidson | 345/173 |

(Continued)

FOREIGN PATENT DOCUMENTS

CA    2 246 920 A1    3/2000

(Continued)

OTHER PUBLICATIONS

U.S. Official Action dated May 26, 2006 in U.S. Appl. No. 09/588,411.

(Continued)

*Primary Examiner*—Richemond Dorvil
*Assistant Examiner*—Eric Yen
(74) *Attorney, Agent, or Firm*—Merchant & Gould

(57) ABSTRACT

Methods and systems are provided for recognizing names entered into a computer-generated document in the context of a plurality of spoken languages and for providing helpful actions to users upon the recognition of the entered names.

23 Claims, 6 Drawing Sheets

U.S. PATENT DOCUMENTS

| | | | |
|---|---|---|---|
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,685,000 A * | 11/1997 | Cox, Jr. | 704/9 |
| 5,708,825 A | 1/1998 | Sotomayor | 395/762 |
| 5,715,415 A | 2/1998 | Dazey et al. | 715/708 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A * | 9/1998 | Miller | 715/534 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | Van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A | 1/1999 | Pandit | 345/335 |
| 5,875,443 A * | 2/1999 | Nielsen | 707/2 |
| 5,877,757 A | 3/1999 | Baldwin et al. | 715/775 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A * | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A * | 1/2000 | Uomini | 709/206 |
| 6,028,605 A | 2/2000 | Conrad et al. | 345/840 |
| 6,029,135 A | 2/2000 | Krasle | 704/275 |
| 6,029,171 A * | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | Van Ketwich | 345/173 |
| 6,073,090 A | 6/2000 | Fortune et al. | 704/8 |
| 6,085,201 A | 7/2000 | Tso | 707/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 707/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A * | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 * | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 * | 10/2001 | Bai et al. | 704/9 |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 * | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 * | 8/2002 | Haynes et al. | 709/206 |
| 6,456,304 B1 | 9/2002 | Anguilo et al. | 715/779 |
| 6,470,091 B2 * | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 * | 2/2003 | Emens et al. | 704/8 |
| 6,519,603 B1 | 2/2003 | Bays et al. | 707/102 |

| | | | |
|---|---|---|---|
| 6,546,433 B1 | 4/2003 | Matheson ............... 709/318 |
| 6,553,385 B2 | 4/2003 | Johnson et al. ......... 707/104.1 |
| 6,556,972 B1 | 4/2003 | Bakis et al. ............... 704/277 |
| 6,556,984 B1 | 4/2003 | Zien .............................. 707/2 |
| 6,564,264 B1 * | 5/2003 | Creswell et al. ............. 709/245 |
| 6,571,241 B1 | 5/2003 | Nosohara ...................... 707/6 |
| 6,571,253 B1 | 5/2003 | Thompson et al. ...... 707/103 R |
| 6,591,260 B1 | 7/2003 | Schwarzhoff et al. ........ 707/2 |
| 6,595,342 B1 | 7/2003 | Maritzen et al. ............. 194/212 |
| 6,601,075 B1 | 7/2003 | Huang et al. ............... 707/104.1 |
| 6,604,099 B1 | 8/2003 | Chung et al. ................... 707/3 |
| 6,615,131 B1 | 9/2003 | Rennard et al. ............. 701/200 |
| 6,618,733 B1 | 9/2003 | White et al. ................. 707/103 |
| 6,622,140 B1 * | 9/2003 | Kantrowitz ................... 707/5 |
| 6,623,527 B1 | 9/2003 | Hamzy ......................... 715/513 |
| 6,625,581 B1 | 9/2003 | Perkowski .................... 705/27 |
| 6,629,079 B1 | 9/2003 | Spiegel et al. ................ 705/26 |
| 6,631,519 B1 | 10/2003 | Nicholson et al. ........... 717/169 |
| 6,636,880 B1 | 10/2003 | Bera ............................ 708/206 |
| 6,643,650 B1 | 11/2003 | Slaughter et al. ............ 707/10 |
| 6,654,734 B1 | 11/2003 | Mani et al. ..................... 707/2 |
| 6,654,932 B1 | 11/2003 | Bahrs et al. ................. 715/507 |
| 6,658,623 B1 | 12/2003 | Schilit et al. ................ 715/513 |
| 6,687,485 B2 | 2/2004 | Hopkins et al. .............. 434/350 |
| 6,694,307 B2 * | 2/2004 | Julien ........................... 707/3 |
| 6,697,824 B1 | 2/2004 | Bowman-Amuah ......... 709/229 |
| 6,697,837 B1 | 2/2004 | Rodov ......................... 709/203 |
| 6,708,189 B1 | 3/2004 | Fitzsimons et al. .......... 707/205 |
| 6,715,144 B2 | 3/2004 | Daynes et al. ............... 717/174 |
| 6,717,593 B1 | 4/2004 | Jennings .................... 715/760 |
| 6,718,516 B1 | 4/2004 | Claussen et al. ............. 715/513 |
| 6,728,679 B1 | 4/2004 | Strubbe et al. ............ 704/270.1 |
| 6,732,090 B2 | 5/2004 | Shanahan et al. ............. 707/3 |
| 6,732,361 B1 | 5/2004 | Andreoli et al. ............. 719/313 |
| 6,741,994 B1 | 5/2004 | Kang et al. ................. 707/102 |
| 6,742,054 B1 | 5/2004 | Upton, IV ...................... 710/6 |
| 6,745,208 B2 | 6/2004 | Berg et al. .................. 707/201 |
| 6,766,326 B1 | 7/2004 | Cena ............................ 707/101 |
| 6,795,808 B1 | 9/2004 | Strubbe et al. .............. 704/275 |
| 6,802,061 B1 | 10/2004 | Parthasarathy et al. ...... 717/173 |
| 6,826,726 B2 | 11/2004 | Hsing et al. ................. 715/513 |
| 6,829,631 B1 * | 12/2004 | Forman et al. ............... 709/202 |
| 6,845,499 B2 | 1/2005 | Srivastava et al. ........... 717/100 |
| 6,857,103 B1 | 2/2005 | Wason ........................ 715/709 |
| 6,859,908 B1 | 2/2005 | Clapper ........................ 715/224 |
| 6,868,625 B2 | 3/2005 | Szabo ........................ 715/738 |
| 6,874,125 B1 | 3/2005 | Carroll et al. ............... 715/705 |
| 6,874,143 B1 | 3/2005 | Murray et al. ............... 717/173 |
| 6,880,129 B1 | 4/2005 | Lee et al. ..................... 715/763 |
| 6,883,137 B1 | 4/2005 | Girardot et al. ............. 715/513 |
| 6,898,604 B1 | 5/2005 | Ballinger et al. ............ 707/101 |
| 6,901,402 B1 | 5/2005 | Corston-Oliver et al. .... 701/101 |
| 6,904,560 B1 | 6/2005 | Panda ......................... 715/202 |
| 6,925,457 B2 | 8/2005 | Britton et al. ................. 707/1 |
| 6,925,470 B1 | 8/2005 | Sangudi et al. .............. 707/102 |
| 6,944,857 B1 | 9/2005 | Glaser et al. ................ 717/173 |
| 6,948,133 B2 | 9/2005 | Haley ......................... 715/780 |
| 6,950,831 B1 | 9/2005 | Haley ......................... 707/104.1 |
| 6,950,982 B1 | 9/2005 | Dourish ...................... 715/512 |
| 6,957,385 B2 | 10/2005 | Chan et al. .................. 715/504 |
| 6,963,867 B2 | 11/2005 | Ford et al. ..................... 707/3 |
| 6,964,010 B1 | 11/2005 | Sharp ......................... 715/507 |
| 6,975,983 B1 | 12/2005 | Fortescue et al. ............. 704/9 |
| 6,976,090 B2 | 12/2005 | Ben-Shaul et al. .......... 709/246 |
| 6,976,209 B1 | 12/2005 | Storisteanu et al. ......... 715/512 |
| 6,981,212 B1 | 12/2005 | Claussen et al. ............. 715/205 |
| 6,986,104 B2 | 1/2006 | Green et al. ................. 715/523 |
| 6,990,654 B2 | 1/2006 | Carroll, Jr. .................. 717/109 |
| 7,003,522 B1 | 2/2006 | Reynar et al. ................ 707/10 |
| 7,013,289 B2 | 3/2006 | Horn et al. .................... 705/26 |
| 7,024,658 B1 | 4/2006 | Cohen et al. ................ 717/117 |
| 7,028,312 B1 | 4/2006 | Merrick et al. .............. 719/330 |
| 7,032,174 B2 | 4/2006 | Montero et al. ............. 715/257 |
| 7,039,859 B1 | 5/2006 | Sundaresan ................. 715/229 |
| 7,051,076 B2 * | 5/2006 | Tsuchiya ..................... 709/206 |
| 7,082,392 B1 | 7/2006 | Butler et al. ................. 704/233 |
| 7,100,115 B1 | 8/2006 | Yennaco ...................... 715/748 |
| 7,113,976 B2 * | 9/2006 | Watanabe .................... 709/206 |
| 7,146,564 B2 | 12/2006 | Kim et al. ................... 715/235 |
| 7,216,351 B1 | 5/2007 | Maes .......................... 719/328 |
| 7,237,190 B2 | 6/2007 | Rollins et al. ................ 715/234 |
| 7,281,245 B2 | 10/2007 | Reynar et al. ................ 717/173 |
| 7,302,634 B2 | 11/2007 | Lucovsky et al. ........... 715/200 |
| 7,305,354 B2 | 12/2007 | Rodriguez et al. ............ 705/26 |
| 7,392,479 B2 | 6/2008 | Jones et al. .................. 715/513 |
| 7,421,645 B2 | 9/2008 | Reynar ........................ 715/206 |
| 7,454,459 B1 | 11/2008 | Kapoor et al. ............... 709/203 |
| 2001/0029605 A1 | 10/2001 | Forbes et al. .................. 717/11 |
| 2001/0041328 A1 | 11/2001 | Fisher ......................... 434/157 |
| 2001/0042098 A1 | 11/2001 | Gupta et al. ................. 709/206 |
| 2001/0049702 A1 | 12/2001 | Najmi ......................... 707/513 |
| 2001/0056461 A1 | 12/2001 | Kampe et al. ............... 709/201 |
| 2002/0002590 A1 * | 1/2002 | King et al. .................. 709/206 |
| 2002/0003469 A1 | 1/2002 | Gupta ....................... 340/407.1 |
| 2002/0003898 A1 * | 1/2002 | Wu ............................. 382/187 |
| 2002/0004803 A1 | 1/2002 | Serebrennikov ............ 715/513 |
| 2002/0007309 A1 | 1/2002 | Reynar ......................... 705/14 |
| 2002/0023113 A1 | 2/2002 | Hsing et al. ................. 707/513 |
| 2002/0023136 A1 * | 2/2002 | Silver et al. .................. 709/206 |
| 2002/0026450 A1 | 2/2002 | Kuramochi ............... 707/104.1 |
| 2002/0029304 A1 | 3/2002 | Reynar et al. ................ 709/332 |
| 2002/0035581 A1 | 3/2002 | Reynar et al. ................ 715/513 |
| 2002/0038180 A1 | 3/2002 | Bellesfield et al. .......... 701/202 |
| 2002/0065110 A1 | 5/2002 | Enns et al. ................... 455/566 |
| 2002/0065891 A1 | 5/2002 | Malik ......................... 709/206 |
| 2002/0066073 A1 | 5/2002 | Lienhard et al. ............. 717/105 |
| 2002/0078222 A1 | 6/2002 | Compas et al. .............. 709/232 |
| 2002/0091803 A1 | 7/2002 | Imamura et al. ............. 709/220 |
| 2002/0099687 A1 | 7/2002 | Krishnaprasad et al. ......... 707/1 |
| 2002/0100036 A1 | 7/2002 | Moshir et al. ............... 717/173 |
| 2002/0103829 A1 | 8/2002 | Manning et al. ............. 707/513 |
| 2002/0104080 A1 | 8/2002 | Woodard et al. ............. 717/176 |
| 2002/0110225 A1 * | 8/2002 | Cullis ........................ 379/67.1 |
| 2002/0111928 A1 | 8/2002 | Haddad ......................... 707/1 |
| 2002/0120685 A1 | 8/2002 | Srivastava et al. ........... 709/203 |
| 2002/0129107 A1 | 9/2002 | Loughran et al. ............ 709/206 |
| 2002/0133523 A1 | 9/2002 | Ambler et al. ............... 707/536 |
| 2002/0149601 A1 | 10/2002 | Rajarajan et al. ............ 345/619 |
| 2002/0156774 A1 | 10/2002 | Beauregard et al. ............. 707/3 |
| 2002/0156792 A1 | 10/2002 | Gombocz et al. ............ 707/100 |
| 2002/0169802 A1 | 11/2002 | Brewer et al. ............... 707/513 |
| 2002/0175955 A1 | 11/2002 | Gourdol et al. .............. 345/821 |
| 2002/0178008 A1 | 11/2002 | Reynar ........................ 704/272 |
| 2002/0178182 A1 | 11/2002 | Wang et al. ............... 715/501.1 |
| 2002/0184247 A1 | 12/2002 | Jokela et al. ................. 707/204 |
| 2002/0188941 A1 | 12/2002 | Cicciarelli et al. ........... 717/175 |
| 2002/0196281 A1 | 12/2002 | Audleman et al. ........... 345/762 |
| 2002/0198909 A1 | 12/2002 | Huynh et al. ................ 715/513 |
| 2003/0002391 A1 | 1/2003 | Biggs ........................... 368/82 |
| 2003/0005411 A1 | 1/2003 | Gerken ....................... 717/120 |
| 2003/0009489 A1 | 1/2003 | Griffin ........................ 707/500 |
| 2003/0014745 A1 | 1/2003 | Mah et al. ................... 717/170 |
| 2003/0025728 A1 | 2/2003 | Ebbo et al. .................. 345/744 |
| 2003/0046316 A1 | 3/2003 | Gergic et al. ................ 707/513 |
| 2003/0050911 A1 | 3/2003 | Lucovsky et al. ................ 707/1 |
| 2003/0051236 A1 | 3/2003 | Pace et al. .................... 717/177 |
| 2003/0056207 A1 | 3/2003 | Fischer et al. ............... 717/174 |
| 2003/0081791 A1 | 5/2003 | Erickson et al. ............. 380/282 |
| 2003/0083910 A1 | 5/2003 | Sayal et al. ..................... 705/7 |
| 2003/0084138 A1 | 5/2003 | Tavis et al. .................. 709/223 |
| 2003/0097318 A1 | 5/2003 | Yu et al. ....................... 705/35 |
| 2003/0101190 A1 | 5/2003 | Horvitz et al. .............. 707/100 |
| 2003/0101204 A1 | 5/2003 | Watson ....................... 708/206 |
| 2003/0101416 A1 | 5/2003 | McInnes et al. ............. 715/513 |
| 2003/0106040 A1 | 6/2003 | Rubin et al. ................. 717/106 |
| 2003/0115039 A1 | 6/2003 | Wang ............................ 704/4 |

| | | | |
|---|---|---|---|
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 717/173 |
| 2003/0195937 A1* | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | 717/178 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| CN | 200410005390.8 | 10/2008 |
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

U.S. Official Action dated May 31, 2006 in U.S. Appl. No. 10/141,712.

U.S. Official Action dated Jun. 1, 2006 in U.S. Appl. No. 10/366,141.

Hewkin, "Smart Tags-the Distributed-Memory Resolution", IEE Review, Jun. 22, 1989, pp. 203-206.

Measuring Units Conversion Table—http://web.archie.org—1997 Internet French Property, pp. 1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Park-Linking", Proceedings of the Sixth International Conference on Information and Knowledge Management, published by ACM Press 1997, pp. 317-324.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering environments", Software Engineering, Publication date: 1999, ISBN: 1-58113-07400.

"Using Flyswat", http://www.flyswat.com/using.html, download date: Sep. 28, 1999, 1 pp.

"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibilty", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

U.S. Appl. No. 10/780,376, filed Feb. 17, 2004, entitled "Methods and Systems for Providing Automatic Actions on Recognized Text Strings in a Computer-Generated Document".

U.S. Appl. No. 10/184,190, filed Jun. 27, 2002, entitled "System and Method for Providing Namespace Related Information".

U.S. Appl. No. 10/183,317, filed Jun. 25, 2002, entitled "System and Method for Issuing a Message to a Program".

U.S. Official Action dated Dec. 29, 2003 in U.S. Appl. No. 09/588,411.

U.S. Official Action dated Feb. 12, 2004 in U.S. Appl. No. 10/154,630.

U.S. Official Action dated Mar. 29, 2004 in U.S. Appl. No. 09/906,552.

U.S. Official Action dated Jun. 14, 2004 in U.S. Appl. No. 09/588,411.

U.S. Official Action dated Jun. 18, 2004 in U.S. Appl. No. 09/818,157.

U.S. Official Action dated Jul. 15, 2004 in U.S. Appl. No. 09/906,467.

U.S. Official Action dated Aug. 20, 2004 in U.S. Appl. No. 09/841,266.

U.S. Official Action dated Sep. 29, 2004 in U.S. Appl. No. 09/907,418.

U.S. Official Action dated Oct. 6, 2004 in U.S. Appl. No. 09/818,157.

U.S. Official Action dated Nov. 2, 2004 in U.S. Appl. No. 10/178,680.

U.S. Official Action dated Dec. 8, 2004 in U.S. Appl. No. 09/588,411.

U.S. Official Action dated Jan. 25, 2005 in U.S. Appl. No. 09/906,552.

U.S. Official Action dated Jan. 26, 2005 in U.S. Appl. No. 10/154,630.

U.S. Official Action dated Mar. 1, 2005 in U.S. Appl. No. 09/818,157.

U.S. Official Action dated Mar. 17, 2005 in U.S. Appl. No. 09/841,265.

U.S. Official Action dated Mar. 24, 2005 in U.S. Appl. No. 10/141,712.

U.S. Official Action dated Apr. 8, 2005 in U.S. Appl. No. 10/164,960.

U.S. Official Action dated Apr. 19, 2005 in U.S. Appl. No. 09/841,266.

U.S. Official Action dated May 5, 2005 in U.S. Appl. No. 09/906,467.

U.S. Official Action dated May 6, 2005 in U.S. Appl. No. 09/907,418.

U.S. Official Action dated May 20, 2005 in U.S. Appl. No. 10/184,298.

U.S. Official Action dated Jun. 3, 2005 in U.S. Appl. No. 10/154,630.

U.S. Official Action dated Jun. 6, 2005 in U.S. Appl. No. 10/164,260.

U.S. Official Action dated Jun. 24, 2005 in U.S. Appl. No. 10/140,544.

U.S. Official Action dated Jul. 25, 2005 in U.S. Appl. No. 10/179,438.

U.S. Official Action dated Sep. 2, 2005 in U.S. Appl. No. 10/366,141.

U.S. Official Action dated Oct. 4, 2005 in U.S. Appl. No. 10/183,317.

U.S. Official Action dated Oct. 5, 2005 in U.S. Appl. No. 10/179,810.

U.S. Official Action dated Oct. 20, 2005 in U.S. Appl. No. 09/906,552.

U.S. Official Action dated Nov. 2, 2005 in U.S. Appl. No. 10/184,190.

U.S. Official Action dated Nov. 10, 2005 in U.S. Appl. No. 10/164,260.

U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. No. 10/184,298.
U.S. Official Action dated Feb. 24, 2006 in U.S. Appl. No. 10/154,630.
U.S. Appl. No. 11/396,937, filed Apr. 3, 2006, entitled "Automatically Adding Proper Names to a Database".
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Official Action dated Apr. 17, 2006 in U.S. Appl. No. 10/184,190.
*Microsoft Computer Dictionary*, Microsoft, Microsoft Press, Fifth Edition, p. 409.
Design methodology and formal validation of hypermedia documents; C.A.S. Santos, L.F.G Soares, G.L. de Souza and J.P. Courtiat; *Proceedings of the sixth ACM international conference on multimedia*, (1998) p. 39-48.
Constructing, organizing, and visualizing collections of tropically related Web resources; Loren Terveen, Will Hill and Brian Amento; *ACM Trans. Comput.-um. Interact.* 6, 1 (Mar. 1999) p. 67-94.
How to personalize the Web; Rob Barrett, Paul P. Maglio and Daniel C. Kellem; *Conference proceedings on human factors in computing systems* (1997) p. 75-82.
Clues: dynamic personalized message filtering; Matthew Marx and Chris Schmandt; *Proceedings of the ACM 1996 conference on computer supported cooperative work* (1996) p. 113-121.
Dynamic hyperlink generation for navigation in relational databases; Karl M. Goschka and Jurgen Falb; *Proceedings of the tenth ACM conference on hypertext and hypermedia: returning to our diverse roots* (1999) p. 23-24.
Perceptual user interfaces: perceptual intelligence; Alex Pentland; *Commun. ACM* 43, 3 (Mar. 2000) p. 35-44.
Textual context analysis for information retrieval; Mark A. Stairmand; *Proceedings of the 20th annual international ACM SIGIR conference on research and development in information retrieval* (1997) p. 140-147.
An XML framework for agent-based E-commerce; Robert J. Glushko, Jay M. Tenenbaum and Bart Meltzer; Commun. ACM 42,3 (Mar. 1999) p. 106.
Technique for Automatically Correcting Words in Text; Karen Kukich; *ACM Comput. Surv.*, 24, 4 (Dec. 1992); pp. 377-439.
Putting People First: Specifying Proper Names in Speech Interfaces; Matt Marx and Chris Schmandt; *Proceedings of the ACM Symposium on User Interface Software and Technology*; 1994; pp. 29-37.
Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.
Exploring the applications user-expertise assessment for intelligent interfaces; Michel C. Desmarais and Jilting Liu; *Proceedings of the conference on human factors in computing systems*, (1993) p. 308-313.
Future directions in user-computer interface software; James D. Foley; *Conference proceedings on organizational computer systems*, (1991) p. 289-297.

Human-computer interface development: concepts and systems for its management; H. Rex Hartson and Deborah Hix; *ACM Comput. Surv.* 1 (Mar. 1989) p. 5-92.
Integrating computer technology, people technology; strategies and case studies from Georgia Tech's Graphics, Visualization and Usability Center; Jim Foley; *Proceedings of the workshop on advanced visual interfaces*, (1994) p. 34-43.
Command management system for next-generation user input; M. Tsai, P. Reiher and G.J. Popek: *Proceedings of the seventh workshop on hottopics in operating systems*, (1999) p. 179-84.
U.S. Appl. No. 09/818,157, filed Mar. 27, 2001, entitled "Automatically Adding Proper Names to a Database."
U.S. Appl. No. 09/841,265, filed Apr. 24, 2001, entitled "Method and System for Applying Input Mode Bias."
U.S. Appl. No. 09/841,266, filed Apr. 24, 2001, entitled "Method and System for Providing Electronic Commerce Actions Based on Semantically Labeled Strings."
U.S. Appl. No. 09/906,552, filed Jul. 16, 2001, entitled "Method and System for Providing Restricted Actions for Recognized Semantic Categories."
U.S. Appl. No. 09/906,467, filed Jul. 16, 2001, entitled "Application Program Interfaces for Semantically Labeling Strings and Providing Actions Based on Semantically Labeled Strings."
U.S. Appl. No. 09/907,418, filed Jul. 17, 2001, entitled "Method and System for Defining Semantic Categories and Actions."
U.S. Appl. No. 09/588,411, filed Jun. 6, 2000, entitled "Method and System for Semantically Labeling Strings and Providing Actions Based on Semantically Labeled Strings."
U.S. Appl. No. 10/141,712, filed May 9, 2002, entitled "Method, System, and Apparatus for Converting Dates Between Calendars and Languages Based Upon Semantically Labeled Strings."
U.S. Appl. No. 10/154,630, filed May 23, 2002, entitled "Method, System, and Apparatus for Converting Numbers Based Upon Semantically Labeled Strings."
U.S. Appl. No. 10/140,544, filed May 7, 2002, entitled "Method, System, and Apparatus for Converting Numbers Between Measurement Systems Based Upon Semantically Labeled Strings."
U.S. Appl. No. 10/155,680, filed May 23, 2002, entitled "Method, System, and Apparatus for Converting Currency Values Based Upon Semantically Labeled Strings."
U.S. Appl. No. 10/179,810, filed Jun. 25, 2002, entitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/__Man__NeXT__html/html, http://duplex.hypermart.net/books.bsd/501-504.html, pp. 1-20.
Kuenning, Geoff, "International Ispell," Version 3.1.00, Oct. 8, 1993, http:// www.rt.com/man/findaffix.1.html, http://www.csee.usf.edu/cgi-bin/man-cgi?ispell, http://fmg-www.cs.ucla.edu/geoff/ispell.html, pp. 1-33.
Kuenning, Geoff; "Ispell, v. 3.1," http://theochem.ki.ku.dk/on__line__docs/ispell/ispell__1.html, pp. 1-6.
"UNIX Man Pages: sed," http://www.calpoly.edu/cgi-bin/man-cgi?spell+1, pp. 1-14.
McMahon, Lee. E., "SED—A Non-Interactive Text Editor," Bell Laboratories, Murray Hill, New Jersey 07974, pp. 1-15.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12.

IBM Corporation, IBM Research Disclosure #368; "Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN I-57595-199-1B, pp. 1-385.

User Manual For AddressMate and AddressMate Plus, CoStar Corporation, AddressMate Software, 1994-1995, pp. 1-210.

Getting Results With Microsoft® Office 97, *Real World Solutions For The Work You Do*, Microsoft Corporation, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

European Communication dated Nov. 17, 2006 in EP 03 011 851.7-2211.

U.S. Official Action dated Aug. 9, 2006 cited in U.S. Appl. No. 10/164,960.

U.S. Final Official Action dated Aug. 18, 2006 cited in U.S. Appl. No. 09/907,418.

U.S. Official Action dated Sep. 7, 2006 cited in U.S. Appl. No. 10/155,680.

U.S. Official Action dated Sep. 28, 2006 cited in U.S. Appl. No. 10/608,267.

U.S. Final Official Action dated Oct. 5, 2006 cited in U.S. Appl. No. 09/841,266.

U.S. Official Action dated Oct. 6, 2006 cited in U.S. Appl. No. 10/140,544.

U.S. Official Action dated Oct. 10, 2006 cited in U.S. Appl. No. 09/841,265.

European Communication dated Apr. 19, 2006 in EP 05 000 506.5-1527.

U.S. Final Office Action dated Oct. 19, 2006 cited in U.S. Appl. No. 09/906,467.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001 113/DOM2-Core.pdf, Nov. 2000, 107 pp.

U.S. Final Official Action dated Jul. 19, 2006 in U.S. Appl. No. 09/906,552.

U.S. Official Action dated Aug. 2, 2006 in U.S. Appl. No. 10/731,899.

European Communication dated Dec. 11, 2006 in EP 03 012 830.0-2211.

Singapore Search Report/Written Opinion dated Jan. 26, 2007 in SG 200500214-2.

U.S. Official Action dated Feb. 6, 2007 cited in U.S. Appl. No. 09/588,411.

U.S. Official Action dated Feb. 7, 2007 cited in U.S. Appl. No. 10/179,438.

U.S. Official Action dated Feb. 21, 2007 cited in U.S. Appl. No. 10/366,141.

European Communication dated Feb. 16, 2007 cited in European Application No. 04 003 683.2-2211.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office,10.d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

U.S. Official Action dated Mar. 12, 2007 cited in U.S. Appl. No. 10/141,712.

U.S. Official Action dated Apr. 10, 2007 cited in U.S. Appl. No. 09/907,418.

U.S. Official Action dated May 14, 2007 cited in U.S. Appl. No. 09/906,552.

U.S. Final Official Action dated May 18, 2007 cited in U.S. Appl. No. 10/155,680.

U.S. Official Action dated May 30, 2007 cited in U.S. Appl. No. 09/906,467.

U.S. Final Office Action dated Jun. 15, 2007 cited in U.S. Appl. No. 10/731,899.

Blaheta et al., "Assigning Function Tags to Parsed Text," Morgan Kaufmann Publishers Inc., 2000, pp. 234-240.

U.S. Office Action dated Jun. 28, 2007 cited in U.S. Appl. No. 09/841,266.

U.S. Final Office Action dated Jul. 12, 2007 cited in U.S. Appl. No. 10/184,298.

U.S. Office Action dated Jul. 13, 2007 cited in U.S. Appl. No. 10/154,630.

U.S. Office Action dated Jul. 20, 2007 cited in U.S. Appl. No. 09/841,265.

U.S. Final Office Action dated Jul. 26, 2007 cited in U.S. Appl. No. 10/164,960.

U.S. Office Action dated Aug. 10, 2007 cited in U.S. Appl. No. 10/179,810.

U.S. Office Action dated Sep. 10, 2007 cited in U.S. Appl. No. 10/179,438.

Malaysian Search Report dated Aug. 2, 2007 cited in Malaysian Application No. PI 20040265.

U.S. Office Action dated Sep. 27, 2007 cited in U.S. Appl. No. 10/608,267.

Russian Official Action dated Oct. 11, 2008 cited in Russian Application No. 2003118722.

Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
U.S. Office Action dated Jan. 25, 2008 cited in U.S. Appl. No. 10/608,267.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
U.S. Appl. No. 11/924,856, filed Oct. 26, 2007 entitled "Providing Contextually Sensitive Tools and Help Content in Computer-Generated Documents".
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
European Communication dated Sep. 25, 2007 cited in European Application No. 03 014 181.6-1243.
Japanese Official Action dated Oct. 19, 2007 cited in Japanese Application No. 2003-128417.
Rubin, Charles, "Microsoft Word 2000 Official Manual," First Edition, Nikkei BP Soft Press, Inc., Aug. 2, 1999, pp. 215-217.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6-1527 / 1447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005 (date unknown).

Malaysian Official Action dated Aug. 29, 2008 cited in Malaysian Application No. PI 20031902.
Polish Official Action dated Aug. 27, 2008 in Polish Application No. P360520.
Toth, V., "Visual C++ 4 Unleashed", 1996, Sams Publishing, p. 174.
Sriram, V., "ComponentXchange: An E-Exchange for Software Components", Master Thesis, CitSeer, May 2001, pp. i-v, 1-77.
Bosak, "XML: The Universal Publishing Format", SGML/XML Europe '98, May 1998, pp. A1-C17.
Kristensen, "Template Resolution in XML/HTML", Computer Networks and ISDN Systems, vol. 30, 1998, pp. 239-249.
Fan et al., "FormPlus: A Form Authoring Toolkit", Proceedings of the Fourteenth Annual Computer Software and Applications Conference, Oct. 31, 1990-Nov. 2, 1990, pp. 255-260.
Boone, "Concept Features in Re: Agent, An Intelligent Email Agent", Proceedings of the 2nd International Conference on Autonomous Agents, May 9-13, 1998, pp. 141-148.
Takkinen et al., "CAFÉ: A Conceptual Model for Managing Information in Electronic Mail", Proceedings of the Annual Hawaii International Conference on System Sciences, 1998, pp. 44-53.
"Smart Tags: Dumb Technology?", webreference.com, Online, Aug. 29, 2001, http://www.webreference.com/xml/column30/3.html, 3 pp.
"Being 'Smart' with Smart Tags in Office XP", Create for Mississippi, Aug. 2001, http://www.create.cett.msstate.edu/create/howto/smart_tags.pdf, 7 pp.
Harold, E.R., "XML: Extensible Markup Language", IDG Books Worldwide, Books 24x7.com printout, 1998, pp. 1-11.
Marais, Hannes, "Supporting Cooperative and Personal Surfing With a Desktop Assistant", 1997, ACM Press, pp. 129-138.
U.S. Appl. No. 10/164,960, filed Jun. 6, 2002, entitled "Providing Contextually Sensitive Actions and Help Content in Computer-Generated Documents".
U.S. Appl. No. 10/164,960, filed Jun. 5, 2002, entitled "Mechanism for Downloading Software Components from a Remote Source for Use by a Local Software Application".
U.S. Appl. No. 10/731,899, filed Dec. 9, 2003, entitled "Mechanism for Downloading Components Associated with XML Documents and Smart Documents".
U.S. Appl. No. 10/366,141, filed Feb. 13, 2003, entitled "Linking Elements of a Document to Corresponding Fields, Queries and/or Procedures in a Database".
U.S. Appl. No. 10/377,258, filed Feb. 28, 2003, entitled "Method and System for Enhancing Paste Functionality of a Computer Software Application".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes," W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.
Japanese Office Action dated Oct. 10, 2008 cited in Application No. 2004-037158.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.
Chinese Office Action dated Oct. 17, 2008 cited in Application No. 03145242.6.
U.S. Final Office Action dated Dec. 8, 2008 cited in U.S. Appl. No. 10/183,317.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Australian First Official Action dated Oct. 21, 2008 cited in Application No. 2003204800.
U.S. Final Office Action dated Dec. 24, 2008 cited in U.S. Appl. No. 09/841,265.
Sharon Oviatt et al., "Integration and Synchronization of Input Modes during Multimodal Human-Computer Interaction," CHI 97, Atlanta, Georgia, Mar. 22-27, 1997, pp. 415-422.
U.S. Office Action dated Dec. 23, 2008 cited in U.S. Appl. No. 10/179,810.
U.S. Office Action dated Jan. 5, 2009 cited in U.S. Appl. No. 10/141,712.
European Statement regarding Grounds of Appeal dated Jan. 13, 2009 cited in Application No. 04 002 224.6.
Japanese Official Action dated May 26, 2009 cited in Application No. 2005-039754.
Hara, T. et al., "Inside Microsoft.NET-Complete Explanation, 'What Microsoft Aims for'", msdn magazine, No. 6, pp. 20-35, ASCII, Japan, Sep. 18, 2000, 19 pp.
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese - no translation yet).
(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Final Office Action dated Jan. 22, 2009 cited in U.S. Appl. No. 10/366,141.
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 0301283.0/2211.
European Communication dated Mar. 18, 2009 cited in European Application No. 04003683.2-2211.
European Summons to Attend Oral Proceedings dated Mar. 20, 2009 cited in European Application No. 03012830.0.
Australian First Examiner's Report dated Sep. 15, 2008 cited in Australian Application No. 2003204379.
Japanese Final Official Action dated Nov. 25, 2008 cited in Japanese Application No. 2002-207514.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Mar. 6, 2009 cited in Japanese Application No. 2004-042140.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
C. Goldfarb, XML Handbook, 1$^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
U.S. Office Action dated Apr. 27, 2009 cited in U.S. Appl. No. 10/154,630.
Malaysian Examination Report dated Nov. 30, 2009 cited in Application No. PI 20040559.

Australian Third Official Action dated Dec. 23, 2009 cited in Application No. 2003204478.
Chinese Decision on Rejection dated Jul. 3, 2009 cited in Application No. 03143003.1.
Norwegian Official Action dated Aug. 24, 2009 cited in Application No. 2003 2550.
Polish Official Notice dated Aug. 25, 2009 cited in Application No. P.365553/DP.
Australian Official Action dated Sep. 11, 2009 cited in Application No. 2003204478.
Polish Official Notice dated Sep. 22, 2009 cited in Application No. P. 364854/DP.
Polish Official Notice dated Sep. 23, 2009 cited in Application No. P. 360520/DP.
Korean Official Action dated Sep. 30, 2009 cited in Application No. 10-2003-40988 (50037.0121ks01).
Japanese Official Notice of Final Rejection dated Oct. 2, 2009 cited in Application No. 2003-162911 (60001.0181jp01).
U.S. Office Action dated Oct. 22, 2009 cited in U.S. Appl. No. 10/377,258.
Japanese Official Notice of Final Rejection dated Oct. 27, 2009 cited in Application No. 2003-161338.
Russian Official Action dated Jun. 21, 2009 cited in Application No. 2005104223/09(005505).
D. Richter, "Windows for professionals" (Win32 API programming for Windows NT 3.5 and Windows 95, translation from English, Moscow: Russian Edition, 1995, ISBN 5-7502-0010-8, pp. 26, 31, 215.
U.S. Final Office Action dated Nov. 30, 2009 cited in U.S. Appl. No. 10/179,810.
Glover et al., "Inferring hierarchical Descriptions," ACM, 2002, pp. 507-514.
Australian First Official Action Report dated Jan. 18, 2009 cited in Application No. 2004200459.

* cited by examiner

METHODS AND SYSTEM FOR RECOGNIZING NAMES IN A COMPUTER-GENERATED DOCUMENT AND FOR PROVIDING HELPFUL ACTIONS ASSOCIATED WITH RECOGNIZED NAMES

FIELD OF THE INVENTION

The present invention relates generally to text recognition in computer-generated documents. More particularly, embodiments of the present invention relate to methods and systems for recognizing names from a plurality of languages entered into computer-generated documents and for providing helpful actions for use in association with recognized names.

BACKGROUND OF THE INVENTION

Since the advent of the computer and software age, software developers have attempted to provide helpful functionality to software users that is contextual in nature. For example, software has been developed for detecting that a user is entering a date into a computer-generated document as the user is typing the date. Before the user can complete the date, the software application popsup today's date to the user and offers to automatically complete the date for the user. Other software has been developed for offering users helpful actions in response to certain data entered by the user. For example, if the user's word processor application recognizes that the user has entered a date, the user may be offered an action that will launch the user's electronic calendar to allow the user to check appointments or to verify information in her calendar for the entered date.

It would be helpful to users to provide them with actions applicable to names entered in computer-generated documents such as contacts documents, word processing documents, spreadsheet documents, slide presentation documents, calendaring documents, and the like. Unfortunately, names are very difficult to recognize because often names are not distinguishable from any other word in a sentence. And, often names have particular meaning in a relation to the language context in which they are entered. Because of the great diversity of name origins, names may be typed into a document written in one language, for example English, but the name may have its origins in a separate language, for example Chinese.

In addition, modern desktop operating systems are provided with various localization features for improving usability for users throughout the world. For instance, some desktop operating systems provide support for multiple user interface languages. Through this type of support for multiple user interface languages, users can configure the user interface of the operating system, for example, a keyboard, to operate in any of a number of languages supported by the host operating system. Additionally, many application programs also support the use of multiple languages for international users. For example, a word processing program or spreadsheet application program may allow a user to create documents in English, Thai, Vietnamese, or other languages installed in the operating system and enabled by the user. Documents may also be created that contain text or other information in a combination of languages. In fact, international users of such applications frequently create documents that include text in more than one language. Different languages often have vastly different grammatical rules for presenting names. For example, some languages commonly place certain titles before names. Some languages commonly place province or location designation after names.

Accordingly, there is a need for a method and system for recognizing names entered into computer-generated documents according to a variety of different languages and language grammatical rules and for providing helpful actions to a user associated with recognized names. It is with respect to these and other considerations that the present invention has been made.

SUMMARY OF THE INVENTION

Embodiments of the present invention provide methods and systems for recognizing names entered into a computer-generated document in the context of a plurality of spoken languages and for providing helpful actions to users upon the recognition of the entered names.

Generally, a user enters text using a host software application such as a word processor application, a spreadsheet application, a contacts application, a calendaring application, a slide presentation application, and the like. Text entered by the user is passed to a recognizer application. Along with the text, a language designation for the text is passed by the host application if a language designation is known. The recognizer application may be a dynamically-linked library (DLL) application. At the recognizer application, the text is passed to a name recognizer application. The name recognizer may be a separate application plug-in that is associated with the recognizer application, or the name recognizer application may be integrated with the recognizer application.

If the language of text is known, the name recognizer application first breaks the text into words. If the text is not already set out in separate words by known delimiters such as spaces or punctuation marks associated with the known language, the name recognizer may pass the text to a word breaker application for breaking the text into words. According to an embodiment of the present invention. The word breaker application may be integrated with the name recognizer application. Alternatively, the word breaker application may be a separate application that may be called by the name recognizer application when needed.

Once the text is broken into separate words, the name recognizer application applies the grammatical rules of the known language to isolate names from the other words of the text. If one or more names are isolated, they are compared against the user's local or remote contact list for matching names. If the isolated names do not match names contained in a contacts list, the words may be compared against a larger database of names including, for example, names particular to the known language. Alternatively, words of the text may be confirmed as names where the analysis of the words based on the grammatical rules of the known language provides a high probability that a given word or words is a name. Once a word is confirmed as a name, by one of these comparisons or analyses, the name is returned by the recognizer application to the host application. The host application may then tag the name and call on the services of one or more action applications for providing helpful actions to the user when the user subsequently focuses her computer cursor or mouse pointer on the tagged name. For example, the user may be provided actions such as adding the name to a contacts list, deleting the name from a contacts list, sending an email message to the name, and the like.

If the language of the text passed to the recognizer application is not known, the text is broken into words as described above, and each word of the text may be compared directly against a contacts list or larger database of names to determine whether any of the words or combination of words comprise a name. If it may be determined that one or more of the words do comprise a name, the name is returned to the host application, as described above, and helpful actions may be provided in association with the name.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

As described briefly above, embodiments of the present invention are directed to methods and systems for recognizing names entered according to a variety of different languages and grammatical rules and for providing helpful actions to a user associated with recognized names. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
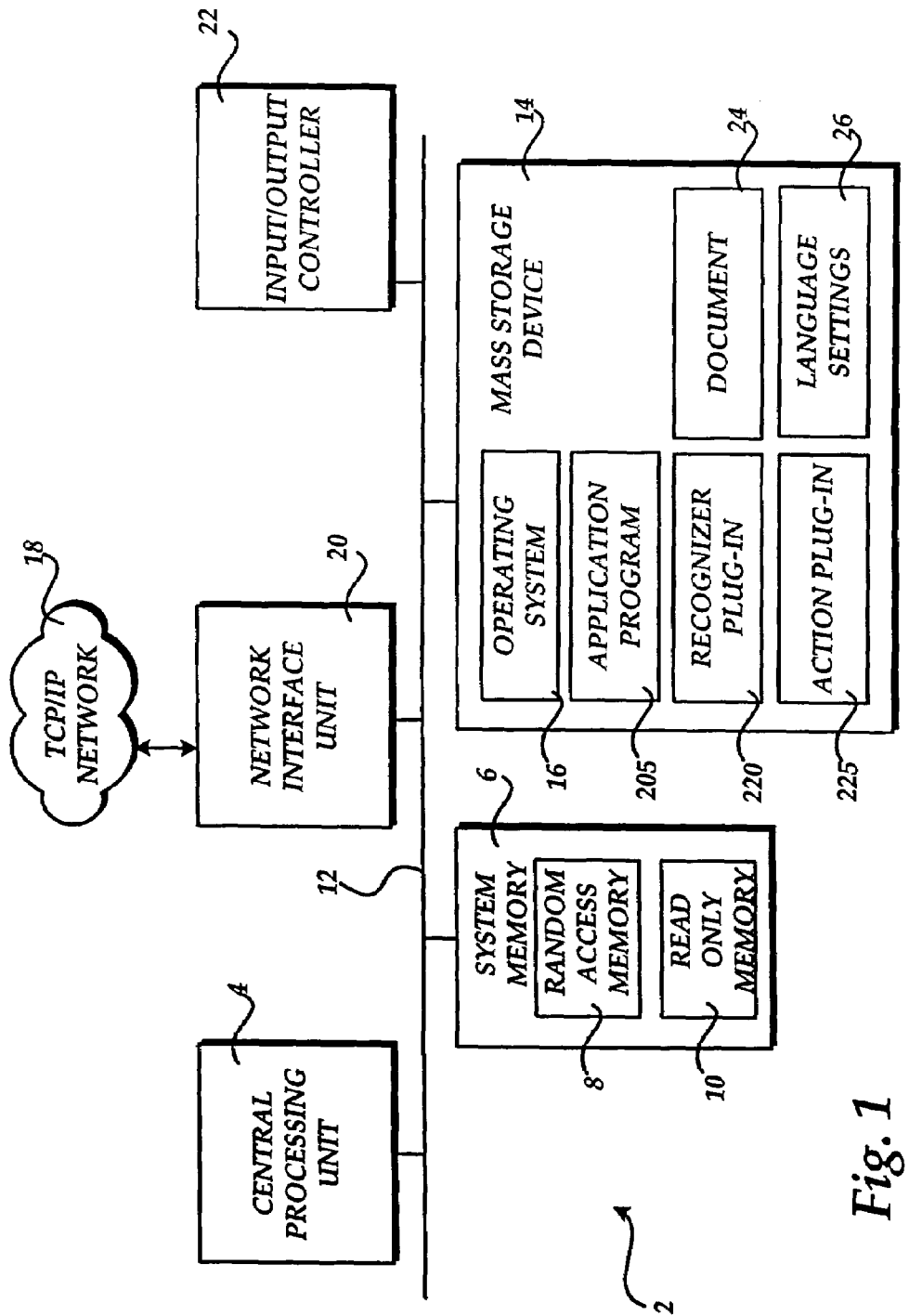
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules. Additional aspects of an illustrative operating environment and software architecture for implementing the various embodiments of the present invention are described in U.S. patent application Ser. No. 09/588,411, entitled "Method and System for Semantically Labeling Strings and Providing Actions Based on Semantically Labeled Strings", which is expressly incorporated herein by reference.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program a spreadsheet application, a contact application, and the like. Application programs for creating and editing other types of electronic documents may also be used with the various embodiments of the present invention.

Embodiments of the present invention provide program modules for use in conjunction with the application program 205 that recognize names in entered text and provide helpful actions on the recognized names. In particular, embodiments of the invention provide a recognizer plug-in 220 and an action plug-in 225. As will be described in greater detail below, the recognizer plug-in 220 recognizes names in an electronic document 24 and labels the names with semantic information. The name recognizer plug-in 220A then passes this information to the application program 205 for use by the action plug-in 225. The action plug-in 225 performs actions on the recognized names.

According to various embodiments of the present invention, the action plug-in 225 may also generate a list of actions that may be performed on a given name. As a part of this process, the action plug-in 225 may query language settings 26 of the application program 205 or operating system 16. The language settings 26 specify the current user interface language and the currently installed and enabled languages for the application program 205 and the operating system 16. The list of actions may then be customized based on the current user interface language and the installed languages. Additional details regarding the operation of the recognizer plug-in 220 and the action plug-in 225, including the use of the language settings 25 will be described in greater detail below.

Figure 2:
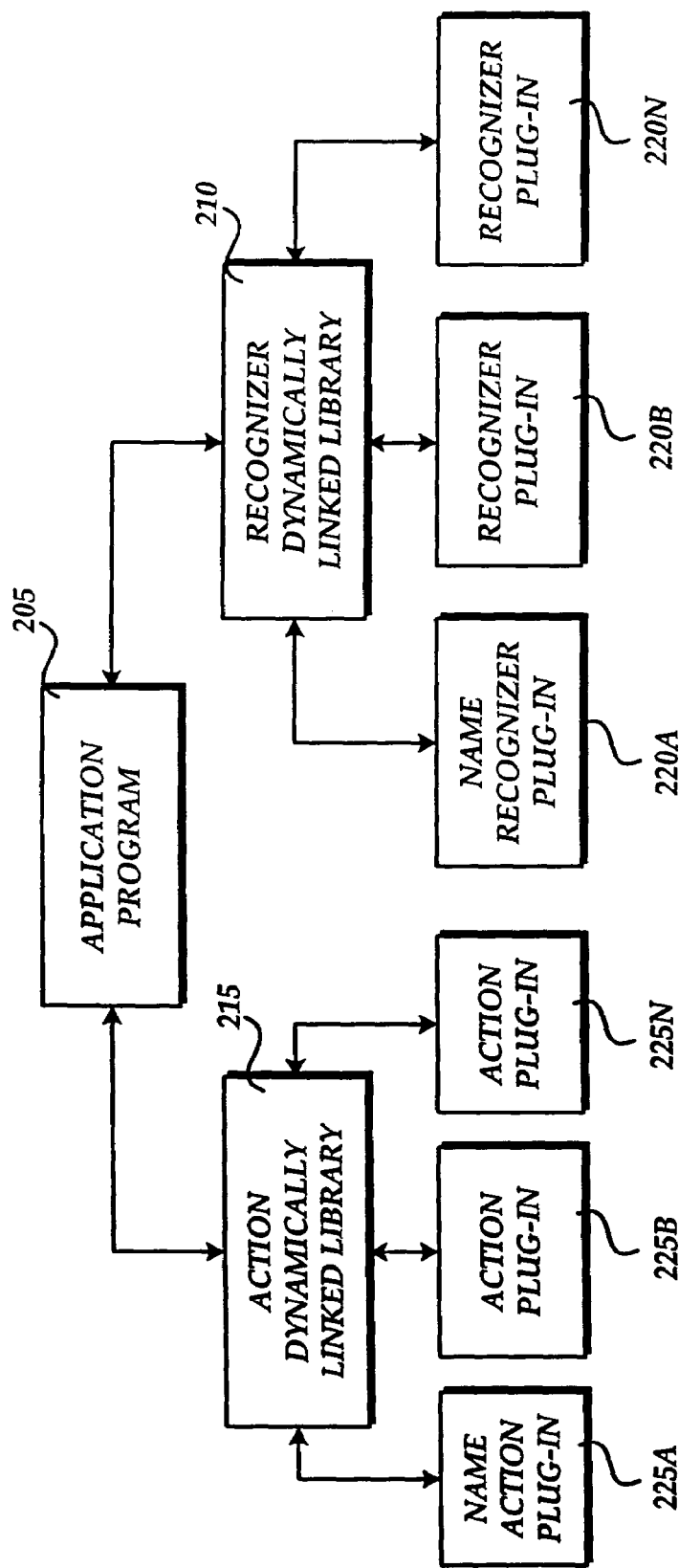
FIG. 2 is a block diagram that shows software architecture for recognizing, labeling, and performing actions on strings of text according to various embodiments of the present invention.

Referring now to FIG. 2, an illustrative software architecture for use in conjunction with the various embodiments of the present invention will be described. The architecture shown in FIG. 2 includes an application program 205, such as a word processor application program, a spreadsheet application program, or other type of application program for creating and editing electronic documents. The application program 205 may also comprise a Web browser.

The application program 205 is able to communicate with a recognizer dynamically linked library ("DLL") 210 and an action DLL 215. As will be described in greater detail below, the recognizer DLL 210 controls one or more recognizer plug-ins 220A-220N and the action DLL 215 controls one or more action plug-ins 225A-225N.

According to one embodiment of the invention, the recognizer plug-ins 220A-220N and the action plug-ins 225A-225N are automation servers. Automation servers are well-known software components that are assembled into programs or add functionality to existing programs running on the WINDOWS XP operating system from MICROSOFT CORPORATION of Redmond, Wash. Automation servers may be written in a variety of computing languages and can be plugged and unplugged at runtime without having to recompile the host program.

The recognizer DLL 210 handles the distribution of text strings from an electronic document being edited by the application program 205 to the individual recognizer plug-ins 220A-220N. The recognizer plug-ins 220A-220N recognizes particular strings in an electronic document, such as a word processing document or a spreadsheet document. The recognizer plug-ins 220A-220N may be packaged with the application program module 205 or they may be written by third parties to recognize particular strings of interest. Typically, the recognizer DLL 210 passes strings to the recognizer plug-ins 220A-220N in single paragraphs or cell value increments. However, strings may be passed to the recognizer plug-ins 220A-220N in other sizes and formats.

As part of recognizing certain strings as including semantic information, the recognizer plug-ins 220A-220N determine which strings are to be labeled and how they are to be labeled. After receiving these results from the various recognizer plug-ins 220, the recognizer DLL 210 sends semantic categories to the application program module 205. According to one actual embodiment of the invention, a name recognizer plug-in 220A is provided for recognizing strings as containing names. Additionally, the recognizer plug-in 220 may return information identifying the location of the name within the text string, including the length of the name.

It should be appreciated that each of the recognizer plug-ins 220A-220N are executed separately. The recognizer DLL 210 is responsible for handling the asynchronicity that results from different recognizer plug-ins 220A-220N returning results at different times. In this manner, various types of data may be recognized within a text string and different actions provided for each semantically labeled string. Additional details regarding the operation of the recognizer plug-in 220 for recognizing numbers will be described below with reference to FIGS. 3-6.

After a string is labeled by a recognizer plug-in 220A-220N, schema information is sent to the application program module 205. A user of the application program module 205 may then execute actions that are associated with the schema information on the recognized string. The action DLL 215 manages the action plug-ins 225A-225N that are executed in order to perform the actions. As with the recognizer plug-ins 220A-22N, the action plug-ins 225A-225N may be packaged with the application program module 205 or written by third parties to perform particular actions that are of interest. The action plug-ins 225A-225N provide possible actions to be presented to the user based upon the schema information, or type label, associated with the string. As will be described in greater detail below, the list of actions provided to the user is dynamically generated for each schema type. This information is then provided to the application program 205 that displays the list of actions to the user when the string is selected.

After an action has been chosen from the list of actions, the action DLL 215 manages the appropriate action plug-in 225A-225N and passes the necessary information between the action plug-in and the application program module 205 so that the action plug-in may execute the desired action. Typically, the application program module 205 sends the action DLL 215 an automation request to invoke the action the user has selected. As will be described in greater detail below, according to one embodiment of the invention, an name action plug-in 225A is provided that provides actions on recognized names. Addition details regarding the operation of the action plug-in 225 will be described in greater detail below with reference to FIGS. 3-6.

Figure 3:
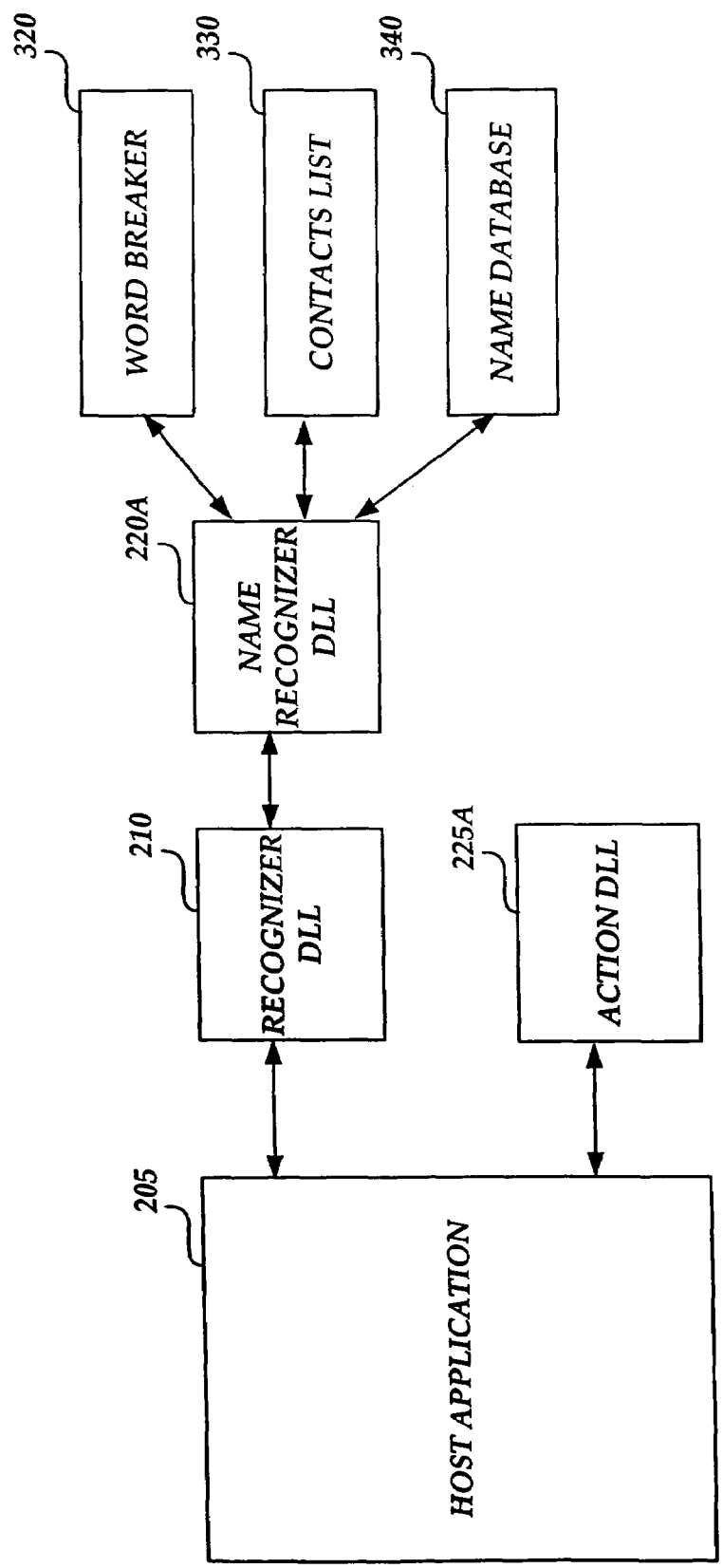
FIG. 3 illustrates a simplified block diagram showing interaction between a host application and a recognizer application and action application for recognizing, labeling, and performing actions on names entered into text according to embodiments of the present invention.

FIG. 3 illustrates a simplified block diagram showing interaction between a host application, a recognizer application and an action application for recognizing, labeling, and performing actions on names entered into text according to embodiments of the present invention. According to embodiments of the present invention, and as briefly described above, text entered using the host application 205 is passed to the recognizer DLL 210 that serves as a distribution point for passing text to other recognizer functionality such as the recognizer plug-ins 220A through 220N. According to embodiments of the present invention, the text passed from the host application is directed from the recognizer DLL 210 to a name recognizer 220A. As described above with reference to FIG. 2, the name recognizer 220A may be a plug-in module that is plugged into the recognizer DLL 210 for providing particular functionality, in this case, recognition of names written using a variety of languages.

Referring still to FIG. 3, the name recognizer DLL 220A may compare words in the text received from the host application against a contacts list 330 or against a larger name database 340 to find a matching name. A suitable contacts list database 330 is provided by the Outlook® software application provided by Microsoft Corporation of Redmond, Wash. The name database 340 may include a large database of known names used according to a variety of different languages. Additionally, the name database 340 may also include a list of predictable names associated with particular languages. For example, as is well known to those skilled in the art, certain countries and associated languages have small numbers of names distributed among the populations of those countries. According to embodiments of the present invention, as described in detail below, if the language in which the text is entered is known, that information may be utilized by the name recognizer DLL 220A to compare words against names contained in the database 340 where it is known that certain names associated with the language in which the text is written are common.

Also shown in FIG. 3 is a word breaker application 320. According to embodiments of the present invention, the text received by the name recognizer DLL 220A may be broken into words according to the language in which the text is written. That is, as is well known to those skilled in the art, some languages such as English, Arabic, Hebrew and Hindi use spaces and other delimiters such as punctuation marks to separate words. If text is received by the name recognizer DLL 220A that is already broken into discrete words, the name recognizer 220A may use those words to compare against the contacts list 330 and the name database 340. If the text received by the name recognizer DLL 220A is not broken into discrete words according to the language in which the text has been created, the name recognizer DLL 220A may pass the text to a word breaker application 320 to break the text into discrete words that may be used by the name recognizer DLL 220A for comparison against the contacts list 330 and the name database 340. According to one embodiment of the present invention, the word breaker application 320 may be integrated with the name recognizer DLL 220A. Alternatively, the word breaker application 320 may be a separate application that may be called by the name recognizer application 220A when needed.

According to an embodiment of the present invention, if the language in which the text is created is known, the name recognizer DLL 220A may utilize the grammatical rules and sentence structure rules of the known language to assist the name recognizer DLL 220A in determining which words, if any, in the text received from the host application 205 comprise names. As is known to those skilled in the art, computer operating systems may be configured to allow computers to receive user input and to provide data output according to a variety of different languages. Likewise, host applications 205 often may be configured to receive data input and to provide data output according to a variety of different languages. Accordingly, if the user of the host application 205 configures her computer and the host application 205 to receive data input and to provide data output in a language such as Vietnamese, for example, the host application 205 may pass the designated language to the recognizer DLL 210 along with the text for determining whether any words in the text comprise a name. If the language is known by the name recognizer 220A, the rules of that language may be utilized by the name recognizer 220A to determine whether a word or words comprise a name. For example, if a particular language requires or commonly presents a standard word immediately preceding a name, such as a title noun like "Mr., Ms., Mrs.," and the like, the name recognizer 220A may utilize that rule in association with the known language to determine that a high probability exists that the word or words immediately following the title noun comprise a name.

Generally, a variety of different grammatical and sentence structure rules exist for many different languages utilized by users of the host application 205. Some languages including English, Arabic, Hebrew and Hindi, utilize word delimiters such as spaces and punctuation marks to separate one word from another. However, these languages don't require or predominately utilize specific grammatical or sentence structure rules relative to names, such as the formal inclusion of a title noun prior to a name, or the inclusion of a province or a location designator after a name. For languages such as these, the name recognizer DLL 220A may know the designated language, but in the absence of specific name oriented rules to the assist the name recognizer DLL, the individual words of text for these languages is compared against the name databases, such as the contacts list 330 and the larger name database 340.

Other languages such as the That language are very formal in nature and typically require or predominately utilize name prefixes or title nouns prior to names, such as Mr. Mrs., Miss, boy, girl, or greeting. For languages such as the That language, the word breaker application 320 may be programmed with a dictionary of the name prefixes or title nouns so that the word breaker application 320 in conjunction with the name recognizer DLL 220A may isolate name prefixes or title nouns in text provided by the host application 205 in order to track a word or words following the name prefix to determine whether those words comprise a name. Other indicators may be utilized by the name recognizer 220A such as the common or maximum numbers of characters, such as vowels and consonants, utilized by a language such as the That language for construction of a name. Inclusion of certain words in some languages may also be used to create an ambiguity by the name recognizer 220A and thus reject a word or words as a name. For example, if a conjunctive word such as "and" or "or" is utilized between two words following a name prefix, for example "Mr. Joe & Sara Smith," the inclusion of the conjunctive word "and" may be utilized by the name recognizer 220A to determine that the words following the name prefix do not comprise a whole name. Accordingly, nothing will be returned by the name recognizer to the host application 205.

Other languages require or commonly utilize province or location designations immediately following a name. For example, "send this document to Joe Smith of Atlanta" includes a province or location designator of "of Atlanta" immediately following the name. In the case of royal descendents in certain languages, province names such as "Duke of York" or "Prince of Wales" immediately follow names. In either of these cases, the name recognizer 220A may be programmed in conjunction with the word breaker application 320 to recognize province or location designations and then to look to a word or words immediately preceding the province or location designation as having a high probability of comprising a name.

Still other languages, such as the Vietnamese language, typically include family clan names such as "Bui", or "Phong" immediately preceding a name. Because the number of family clan names is relatively small, the known clan names associated with the language, such as Vietnamese, may be utilized by the word breaker application 320 and the name recognizer 220A for determining whether words immediately following a known clan name comprise a name. In many Far East languages, a relatively small number of common names are held by a majority of the populations originating under those languages. For example, the name "Kim" is a very common name in the Korean population and under the Korean language. Accordingly, common names utilized in such languages may be stored in memory and may be utilized by the word breaker application 320 in conjunction with the name recognizer 220A to quickly compare words of text received from the host application 205 to a list of known common names associated with a known language. In any of the above cases, other general rules may apply. For example, in many languages names are capitalized. Such general rules may be used in conjunction with other more particular rules to assist the name recognizer 220A in confirming that a word of text received from the host application 205 comprises a name.

Figure 4:
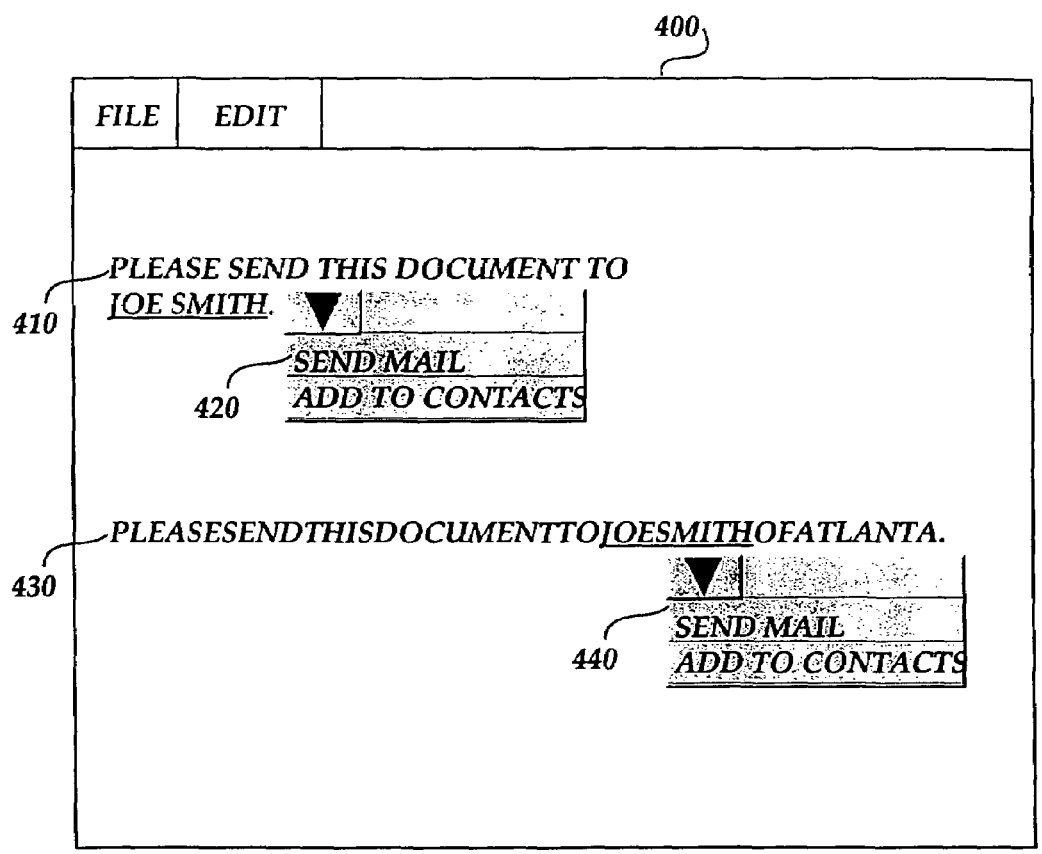
FIG. 4 is a screen diagram showing an exemplary host application text entry screen and showing text entered and recognized as a name according to embodiments of the present invention.

FIG. 4 is a screen diagram showing an exemplary host application text entry screen and showing text entered and recognized as a name according to embodiments of the present invention. As shown in the exemplary text entry screen 400 of a host application 205, a text string 410 including "please send this document to Joe Smith" is provided. According to embodiments of the present inventions, this text string is passed to the name recognizer 220A via the recognizer DLL 210. According to embodiments of the present invention, the word breaker application 320 is utilized by the name recognizer DLL 220A to parse the text string into individual words. If need be, the word breaker application 320 may parse the text string one character at a time by passing combinations of characters back to the name recognizer DLL 220A for comparing against the databases 330, 340. The word breaker application may also use delimiters such as spaces between the combinations of characters to determine the beginning and ending of individual words. The name recognizer DLL 220A recognizes that the words "Joe Smith" comprise a name and passes those words back to the host application 205 tagged as a name. In response, the words "Joe Smith" in the text string are marked in some manner, such as the underlined marking shown in FIG. 4, to indicate to the user that these words have been associated with some type of additional functionality.

According to an embodiment of the present invention, once the user focuses her computer cursor or mouse pointer over the tagged words, the action DLL 225A associated with names may cause the action window 420 to be opened to provide actions to the user in association with the tagged name. As shown in FIG. 4, the action window 420 includes two actions including "send mail" and "add to contacts." Accordingly, the user may select one of the provided actions to launch the functionality associated with the action. For example, if the user selects the "add to contacts" action, the user's contacts list provided by the user's calendaring program may be launched to allow the user to add the name "Joe Smith" to the user's contacts list.

Referring still to FIG. 4, a second text string 430 "pleasesendthisdocumenttoJoeSmithofAtlanta" is provided. According to the illustration shown in FIG. 4, this text string has been created according to a language that does not use any type of word delimiters such as spaces or punctuation marks to separate words in the text string. Additionally, the text string 430 includes a province designator "of Atlanta" immediately following the name "Joe Smith". According to embodiments of the present invention, the word breaker application 320 is utilized by the name recognizer DLL 220A to parse the text string into individual words. If need be, the word breaker application 320 may parse the text string one character at a time by passing combinations of characters back to the name recognizer DLL 220A for comparing against the databases 330, 340. Moreover, as described above with reference to FIG. 3, the name recognizer DLL 220A may have received with the text string an indication of the language in which the text string has been created. The name recognizer DLL 220A then may determine that the language in which the text string is created commonly requires or presents province or location identifiers such as "of Atlanta" immediately following a name. The name recognizer DLL 220A then may use this information to determine that the words "Joe Smith" immediately preceding the province or location identifier "of Atlanta" comprise a name. Because the words "Joe Smith" are passed back to the host application 205 as a name, the action DLL 225A causes the action window 440 to be presented to the user when the user focuses on the marked name "Joe Smith" in the text string 430, as described above. As should be understood, the action items shown in the action windows 420 and 440 are only a small sampling of the actions that may be made available to the user. Other actions include "scheduling and meeting", "inserting address", and the like.

Figure 5:
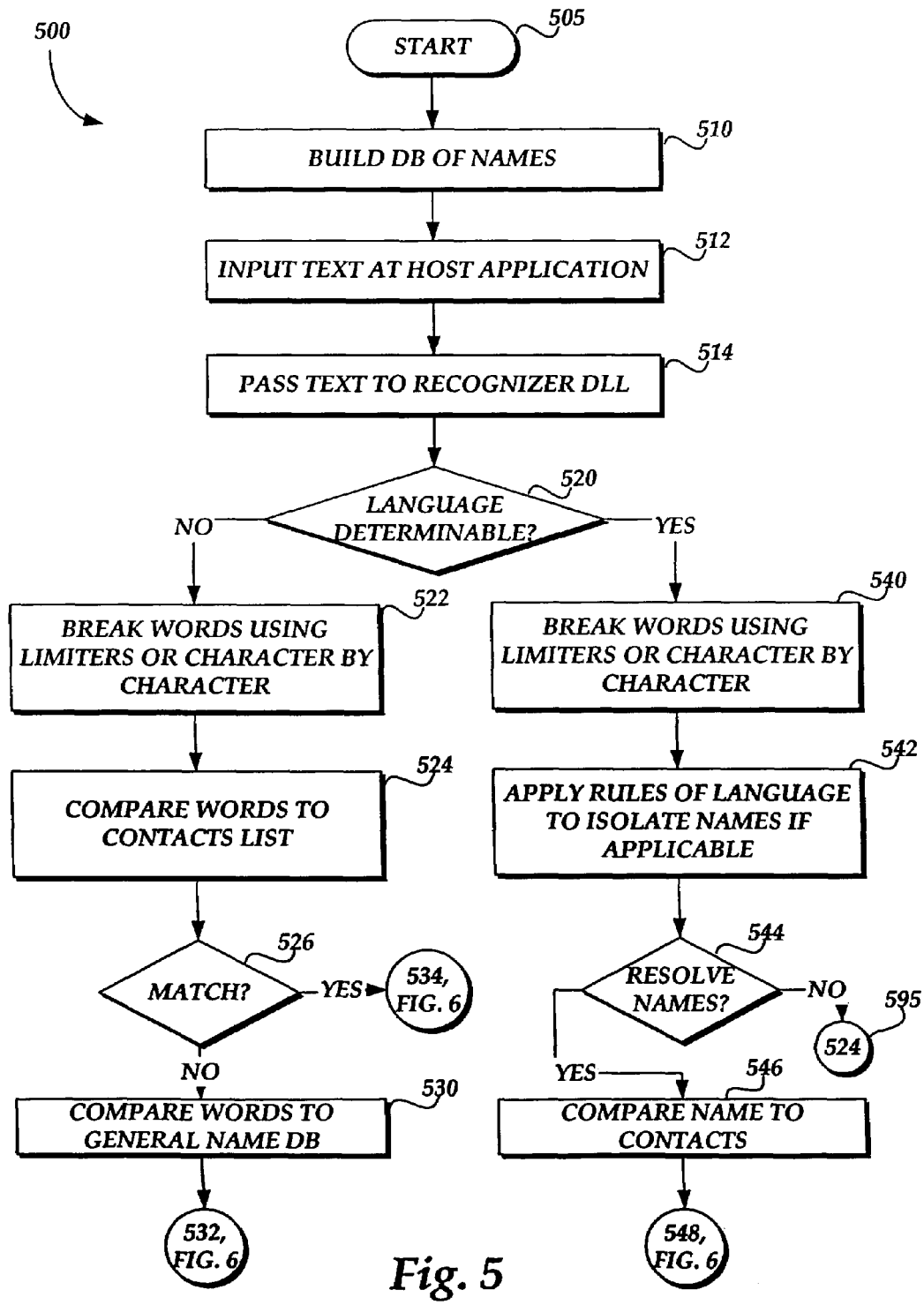
FIGS. 5 and 6 are flow diagrams showing an illustrative routine for recognizing a name in text entered into a computer-generated document and for providing helpful actions associated with the recognized name.
Figure 6:
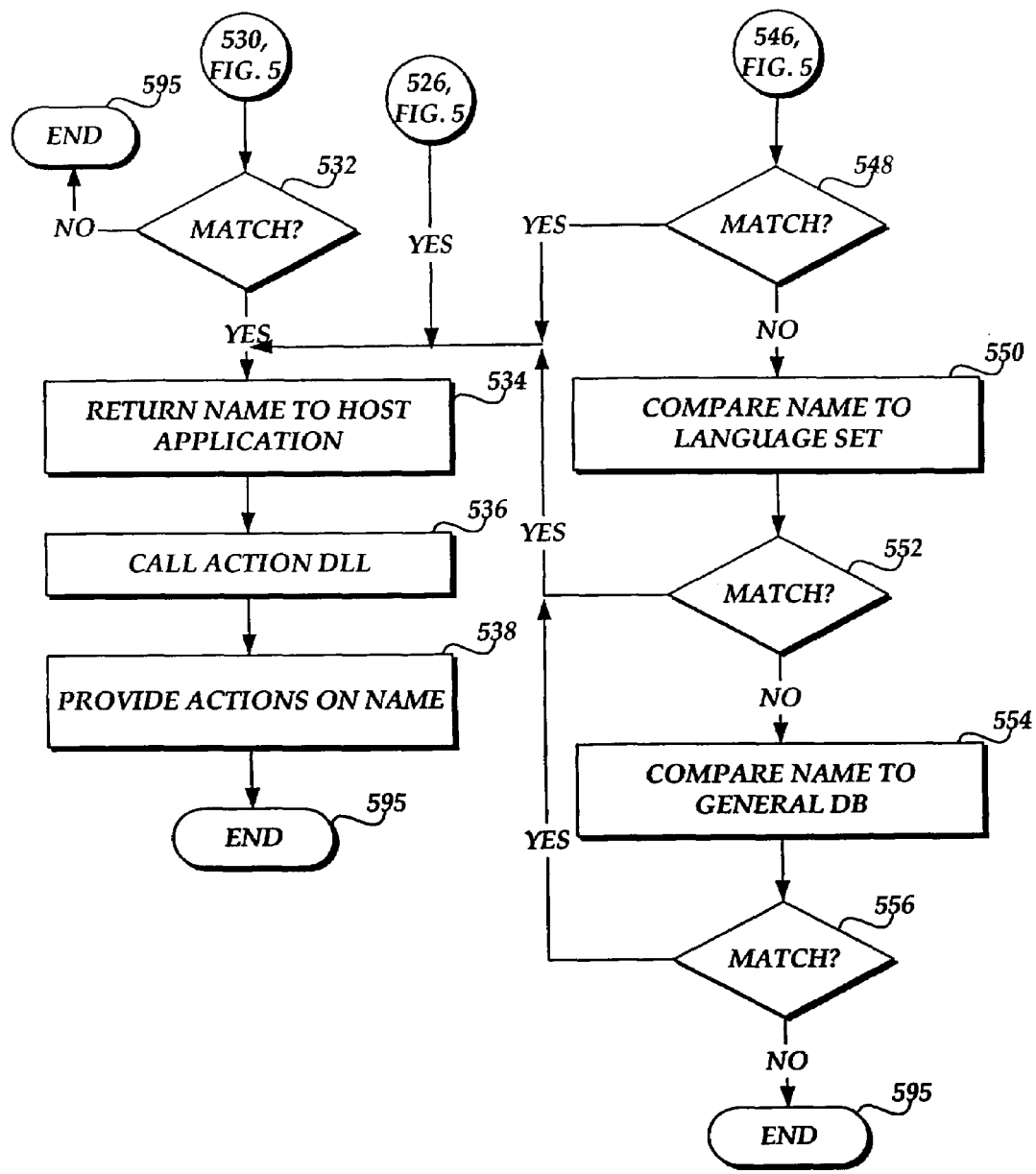

FIGS. 5 and 6 are flow diagrams showing an illustrative routine for recognizing a name in text entered into a computer-generated document and for providing helpful actions associated with the recognized name. The method 500 begins at start step 505 and moves to step 510 where a database of names is built for use by the name recognizer 220A in resolving names in text passed to the name recognizer from the host application 205. According to embodiments of the present invention, the database of names may include a contacts list 330 and a separate name database 340, as described above. At step 512, text is input by a user at the host application 205. As described above, the host application 205 may be one of a number of software applications capable of receiving text input from the user. Moreover, the host application 205 may be an application allowing the user to input text according to a variety of languages by selecting an input language using the host application 205 and/or selecting an alternate language user interface via the operating system 16 of the user's computer two.

At step 514, text entered by the user via the host application 205 is passed to the recognizer DLL 210. As should be understood by those skilled in the art, text may be passed to the recognizer DLL in sentences, paragraphs, or other discrete text fractions. Alternatively, text may be passed to the recognizer DLL each time the users goes idle, for example where the user pauses between keystrokes for more than a set time duration.

At step 520, a determination is made as to whether the language of the text passed from the host application 205 is determinable. As described above, if the language of the text passed from the host application 205 has been set by the user via the host application 205 or via the user interface, such as a keyboard, via the user's computer operating system, that information may be passed along with the text selection to the recognizer DLL 210. If the language is determinable, the method proceeds to step 540, and the recognizer DLL passes the text selection and language indicator data to the name recognizer DLL 220A.

At step 540, the text received by the name recognizer 220A is broken into words for the eventual determination as to whether any of the words comprise a name. As described above, according to some languages, the text may already be broken into readily definable words by use of word delimiters such as spaces and punctuation marks. For example, referring back to FIG. 4, the text selection 410 includes a set of words that are separated by spaces. On the other hand, a text selection 430, illustrated in FIG. 4 may be presented to the name recognizer 220A that is created using a language that does not use word delimiters, such as spaces or punctuation marks, where each character is run together in side-by-side orientation. In either case, if necessary, the word breaker application 320 is utilized by the name recognizer 220A for separating the text into words that may be compared against language rules or databases to determine whether any of the words comprise a name. In the case of the text string 430 where the text string is not already broken into definable words, the word breaker 320 may, if necessary, parse the text string one character at a time forming combinations of characters that may be compared against the databases or language rules to determine whether the combinations of characters are words that comprise a name.

At step 542, because the language of the text selection is known, the name recognizer DLL 220A applies the rules of the known language in an attempt to isolate names contained in the text selection passed from the host application 205. For example, referring to the text string 430, illustrated in FIG. 4, if the language of the text string requires or commonly uses a province or location designation immediately after a name, the name recognizer 220A may locate and recognize the phrase "of Atlanta" as a province name or location designator that commonly or by requirement immediately follows a name according to the language of the text selection. Accordingly, the name recognizer 220A may then look to words immediately preceding the phrase "of Atlanta" to determine that a high probability exists that the words immediately preceding the location designator comprise a name.

At step 544, after the name recognizer 220A has applied the rules of the known language to the text selection, a determination is made as to whether the rules comparison allows the name recognizer 220A to resolve any of the words as names. If not, the method may proceed to step 524 where the words of the text selection are compared against the databases 330, 340 in the same manner, as would be words of a text selection where the language of the text selection is not known. If the name recognizer 220A is able to resolve names from the text selection by analyzing the rules of the known language, the method proceeds to step 546. As should be understood by those skilled in the art, the names resolved by the name recognizer 220A by analysis of the rules of the language may not result in an absolute confirmation that a given word or words is a name, but may result in a high probability that a given word or words is a name, and confirmation may be achieved by comparing such words to the user's contact's list 330 or to the other name databases 340. Alternatively, once the name recognizer 220A determines that a sufficient probability exists that a given word or words is a name based on an analysis of the language rules associated with the words, the method may proceed directly to step 534, and the words may be returned to the host application 205 as a name, as will be described in further detail below.

At step 546, the words resolved as a name by the name recognizer by analyzing the language rules associated with the words is compared against the user's contacts list 330. It is useful to compare the words against the user's contacts list 330 because if the words match a name in the user's contact lists 330, actions may ultimately be provided to the user such as sending an email message to the named person. At step 548, FIG. 6, a determination is made as to whether the word or words matches a name contained in the user's contact's list 330. If the words do match a name contained in the user's contacts list 330, the method proceeds to step 534, and the name is returned to the host application 205 as a name, as will be described in detail below. If the words do not match a name contained in the user's contacts list 330, the method proceeds to step 550 and the words are compared against a language-specific name set to determine whether the words match names that are commonly used in the language in which the text string has been created.

At step 552, if the words match names contained in the language-specific set of names, the method proceeds to step 534, and the name is returned to the host application, as described below. If no match is achieved, at step 552, the method proceeds to step 554 and the words are compared against a general database of names 340 where the words are compared against a database containing an exhaustive list of known names. At step 556, if the words match names contained in the general name database, the method proceeds to step 534, and the names are returned to the host application, as described below. If the words do not match any of the databases 330, 340, the method may end at step 595. It should be understood by those skilled in the art that the rules analysis and the comparisons to the databases described above may be done simultaneously or in the order described above. According to an exemplary embodiment of the present invention, the order described above allows for better efficiency in terms of processing time because the words are first compared against databases with the strongest likelihood of matching names.

Referring back to step 520, if the text selection originally passed to the recognizer DLL 210 from the host application 205 does not have an associated known language, the method proceeds to step 520 and the text string is broken into words either using word delimiters such as spaces and/or punctuation marks or by using the word breaker application 320, as described above. As should be understood, a language designation may not have been passed to the recognizer DLL, or the name may be included in a mixed language document. For example, the user may create the document in the English language, but the user may insert Vietnamese based names, for example, throughout the document. In this case, because no particular language is associated with the text passed to the name recognizer 220A, at step 524, each word broken from the text selection is first compared against the user's contacts list 330. At step 526, if any of the words from the text selection match a name or names contained in the user's contacts list 330, the method proceeds to step 534, and the names are passed to the host application 205, as described below. If words broken from the text string do not match names contained in the user's contacts list 330, the method proceeds to step 530, and the words are compared against names contained in a general database 340.

At step 532, FIG. 6, a determination is made as to whether any of the words from the text string passed to the name recognizer 220A match any names contained in the general names database 340. If not, the method may end at step 595. If the words match names contained in the general name database 340, the method proceeds to step 534, and the name is returned to the host application 205.

At step 536, the host application 205 calls the action DLL 215 for actions on the returned name. As illustrated in FIG. 2, according to an embodiment of the present invention, the action DLL 215 may utilize a name action plug-in 225A for providing name-oriented actions on the returned name. At step 538, actions from the action DLL 215 are provided for the returned name. For example, referring to the text string 410, illustrated in FIG. 4, the name "Joe Smith" is marked with an underline or other indicator that the name has been tagged for actions associated with the name. Upon focusing on the tags name by placing the computer cursor or mouse pointer in the tagged name, the action window 420 is made available to the user so that the user can select available actions. As should be understood, the actions made available to the user may be provided dynamically based on the name returned. For example, if the name returned from the name recognizer DLL 220A is a name that matched a name in the user's contacts list 330, an action such as "send mail" may be provided because the electronic mail address associated with the name may be available in the contacts list 330. If the name returned by the name recognizer DLL was not located in the contacts list 330, but was located in a general database 340, an action such as "add to contacts" may be provided to allow the user to add the returned name to the user's contacts list. As should be understood, selection of one of a number of available actions provided to the user may cause some other action, such as the launching of a user interface to allow the user to send an email message, edit a contacts list, prepare a memo, and the like. After actions are provided to the user for the returned name at step 538, the method ends at step 595.

As described herein, methods and systems are provided for recognizing names in a text string entered according to a variety of languages and for providing helpful actions on the recognized name. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of recognizing names from a text string entered according to one of a plurality of spoken languages for providing helpful actions in association with recognized names, the method being implemented at least in part by a computer and comprising:
    receiving, by the computer, a previously generated text string;
    passing the text string to a name recognizer application;
    determining whether a particular spoken language is associated with the text string;
    applying a set of name rules of the spoken language associated with the text string to a plurality of individual words comprising the text string, the set of name rules comprising grammatical rules and sentence structure rules in the spoken language;
    determining whether any of the plurality of individual words comprise a name according to the set of name rules of the spoken language associated with the text string;
    if any of the plurality of individual words comprise a name,
        generating a list of user actions that may be performed on the name, wherein generating the list of actions that may be performed on the name comprises,
            analyzing the language associated with the text string, and
            determining if the name exists in a user contacts database,
        associating the list of actions with the name,
        returning the name and the list of user actions associated with the name to a host application with which the text string was previously generated for providing the list of user actions associated with the name, and
        marking the name in the text string to indicate actions are available in association with the name; and
    providing to a user the list of user actions in association with the name.

2. The method of claim 1, prior to passing the text string to the name recognizer application,
    passing the text string to a text recognizer application; and
    passing the text string from the text recognizer application to the name recognizer application.

3. The method of claim 1, after passing the text string to the name recognizer application, breaking the text string into a plurality of individual words.

4. The method of claim 1, wherein the list of actions in association with the name includes enabling the user to send electronic mail to an electronic mail address associated with the name.

5. The method of claim 1, wherein the list of actions include enabling the user to modify the name in the user contacts database, wherein modify includes any member of the groups comprising: add and delete.

6. The method of claim 1, after determining whether any of the plurality of individual words comprise the name according to the set of name rules of the spoken language associated with the text string, comparing the name to the user contacts database to determine whether the name matches a contact name contained in the user contacts database.

7. The method of claim 6, wherein if the name does not match the contact name contained in the user contacts database, comparing the name to a database of names common to the spoken language associated with the text string.

8. The method of claim 7, wherein if the name does not match a name contained in the database of names common to the spoken language associated with the text string, comparing the name to a general database of names.

9. The method of claim 1, prior to receiving the previously generated text string, building the user contacts database.

10. The method of claim 1, wherein applying the set of name rules of the spoken language associated with the text string to the plurality of individual words comprising the text string, includes determining whether any words in the text string are preceded by a title word.

11. The method of claim 1, wherein applying the set of name rules of the spoken language associated with the text string to the plurality of individual words comprising the text string, includes determining whether any words in the text string are followed by a location designation.

12. The method of claim 1, wherein applying the set of name rules of the spoken language associated with the text string to the plurality of individual words comprising the text string, includes determining whether any words in the text string are preceded by a clan name.

13. A system of recognizing names from a text string entered according to one of a plurality of spoken languages for providing helpful actions in association with recognized names, comprising:
    a host application operative
        to receive a previously generated text string;
        to pass the text string to a name recognizer application;
    a name recognizer application operative
        to determine whether a particular spoken language is associated with the text string;
        to apply a set of name rules of the spoken language associated with the text string to a plurality of individual words comprising the text string, the set of name rules comprising grammatical rules and sentence structure rules of the spoken language;
        to determine whether any of the plurality of individual words comprise a name according to the set of name rules of the spoken language associated with the text string;

to generate a list of user actions that may be performed on the name, in response to the determination whether any of the plurality of individual words comprise a name, wherein generating the list of actions that may be performed on the name comprises analyzing the language associated with the text string and determining if the name exists in a user contacts database;

to associate the list of user actions with the name;

to return the name and the list of user actions associated with the name to the host application with which the text string was previously generated for providing the list of user actions associated with the name;

to mark the name in the text string to indicate the list of user actions are available in association with the name, if any of the plurality of individual words comprise a name; and to provide to a user the list of user actions in association with the name.

14. The system of claim 13, wherein the list of actions associated with the name includes enabling the user to send electronic mail to an electronic mail address associated with the name.

15. The system of claim 13, wherein the list of actions associated with the name include enabling the user to modify the name in the user contacts database, wherein modify includes any member of the groups comprising: add and delete.

16. A computer readable medium containing instructions which when executed by a computer perform the steps of:

receiving a previously generated text string;

passing the text string to a name recognizer application;

determining whether a particular spoken language is associated with the text string;

applying a set of name rules of the spoken language associated with the text string to a plurality of individual words comprising the text string, the set of name rules comprising grammatical rules and sentence structure rules of the spoken language;

determining whether any of the plurality of individual words comprise a name according to the set of name rules of the spoken language associated with the text string;

generating a list of user actions that may be performed on the name, wherein generating the list of actions that may be performed on the name comprises analyzing the language associated with the text string and determining if the name exists in a user contacts database;

associating the list of user actions with the name;

if any of the plurality of individual words comprise a name, returning the name and the list of user actions associated with the name to a host application with which the text string was previously generated for providing the list of user actions associated with the name, marking the name in the text string to indicate the list of user actions are available in association with the name, and providing to a user the list of user actions in association with the name.

17. The computer readable medium of claim 16, prior to passing the text string to the name recognizer application, passing the text string to a text recognizer application; and passing the text string from the text recognizer application to the name recognizer application.

18. The computer readable medium of claim 16, after passing the text string to the name recognizer application, breaking the text string into the plurality of individual words.

19. The computer readable medium of claim 16, after returning the name to the host application with which the text was previously generated, passing the name to an action application for providing actions associated with the name.

20. The computer readable medium of claim 16, further comprising upon selection of the marked name in the text string, providing the list of actions associated with the name.

21. The computer readable medium of claim 20, wherein the list of actions associated with the name includes enabling the user to send electronic mail to an electronic mail address associated with the name.

22. The computer readable medium of claim 20, wherein the list of actions associated with the name include enabling the user to modify the name in the user contacts database, wherein modify includes any member of the groups comprising: add and delete.

23. A method of recognizing names from a text string entered according to one of a plurality of spoken languages for providing helpful actions in association with recognized names, the method being implemented at least in part by a computer and comprising:

receiving, by the computer, a previously generated text string;

passing the text string to a name recognizer application;

determining whether a particular spoken language is associated with the text string;

applying a set of name rules of the spoken language associated with the text string to a plurality of individual words comprising the text string, the set of name rules comprising grammatical rules and sentence structure rules in the spoken language, wherein applying a set of name rules of a spoken language associated with the text string to a plurality of individual words comprising the text string comprises, determining whether any words in the text string are preceded by a title word, determining whether any words in the text string are followed by a locating designation, and determining whether any words in the text string are preceded by a clan name;

determining whether any of the plurality of individual words comprise a name according to the set of name rules of the spoken language associated with the text string;

if any of the plurality of individual words comprise a name, comparing the name to a user contacts database to determine whether the name matches a contact name contained in the user contacts database, generating a list of user actions that may be performed on the name, wherein generating the list of user actions that may be performed on the name comprises analyzing the language associated with the text string and determining if the name exists in a user contacts database, associating the list of user actions with the name, returning the name and the list of user actions associated with the name to a host application with which the text string was previously generated for providing the list of user actions associated with the name, and marking the name in the text string to indicate the list of user actions are available in association with the name; and receiving, by the host application, a selection of the marked name in the text string, and in response to the selection, providing to a user the list of user actions in association with the name.

* * * * *